March 14, 1939. K. DZIEWIOR 2,150,365

PHOTOGRAPHIC CAMERA WITH AUTOMATIC EXPOSURE ADJUSTMENT

Filed April 29, 1937    2 Sheets-Sheet 1

SECTION II-II

SECTION III-III

Inventor
Kurt Dziewior
by B. Singer
Attorney

Patented Mar. 14, 1939

2,150,365

UNITED STATES PATENT OFFICE 2,150,365

PHOTOGRAPHIC CAMERA WITH AUTOMATIC EXPOSURE ADJUSTMENT

Kurt Dziewior, Berlin, Germany

Application April 29, 1937, Serial No. 139,807
In Germany April 20, 1936

8 Claims. (Cl. 95—10)

The experiment has repeatedly been made to regulate the objective stop or the shutter of a photographic camera by a photoelectric exposure meter.

Electrical and mechanical aids especially in connection with electromotor and relay circuits were used for this. It was also already proposed to drive a particularly lightly constructed special stop directly by the pointer of the exposure meter.

In a further proposal the resilient pointer of an exposure meter serves as impact member for a key member which is connected with the adjustment member for the stop. Thereby the pointer of the exposure meter, which is very sensitive to mechanical forces, is either pressed by the key member against two supporting surfaces or else the teeth of a comb-like holder take up the pressure originating from the key member.

While the first mentioned arrangements require too great an expenditure of technical means, there results from the last mentioned solution an inadmissibly strong stress of the pointer of this highly sensitive measuring apparatus. For the forces acting on the bearings of the pointer are only partially taken up by supporting surfaces. Furthermore the thin pointer itself is strongly loaded as it serves as impact member for the key member. The introduction of the pointer into the gaps of the comb-like holder has the disadvantage that the pointer can be damaged if its momentary position is not directly opposite a tooth gap.

Now the present invention solves this problem in that the pointer of a photoelectric exposure meter after having been deflected by the photo cell current is pressed against one of a series of movable stop members, so that at any time the stop member corresponding to the pointer position is brought into the path of a feeler which effects an adjustment of the previously tensioned shutter. Thereby the pointer system is subjected only to neglectable mechanical stresses.

The force for moving the feeler is supplied by a spring which is tensioned manually and is automatically released when the pointer is pressed against one of the stop members. On winding up of the spring the contact for the photo cell circuit is automatically closed and opened again on release, for the circuit is to be opened in the state of rest. The pressing of the pointer against one of the stop members takes place simultaneously with the tensioning of the shutter winding. A camera according to the present invention is therefore, apart from the distance adjustment, wholly ready for exposure after manually actuating two spring tensioning devices. It can at once be seen that thereby the readiness for exposure of a camera is considerably increased and that the service and adjustment measures required by hand are reduced to a lowest degree. Further the two spring windings can be so connected that they are successively wound up by one handle and thereby a further simplification of the adjustment procedure is attained.

Figures 1–5 show an embodiment of the invention by way of example. As series of impact members for the shutter speed adjustment a pin chest is here used with individual pins $a$. As momentary exposure times there are provided the times $1/5$, $1/10$, $1/25$, $1/50$, $1/100$, $1/250$, $1/500$, and $1/1000$ of a second. The pin chest has eight pins $a$ corresponding to these eight times. The mechanism further receives two manually operable winding knobs $b$ and $c$ for tensioning the two springs $d$ and $e$ respectively. The spring $d$ stores the energy necessary for tensioning the shutter whilst a gear wheel $f$ mounted on the axis of the knob $c$ actuates a toothed segment $g$ and simultaneously thereby tensions the spring $e$. The winding knob $c$ is connected with the shutter regulator by means of the shaft $c'$ which is thus adjusted on the tensioning of the spring $e$ to a definite exposure time.

Figure 6:
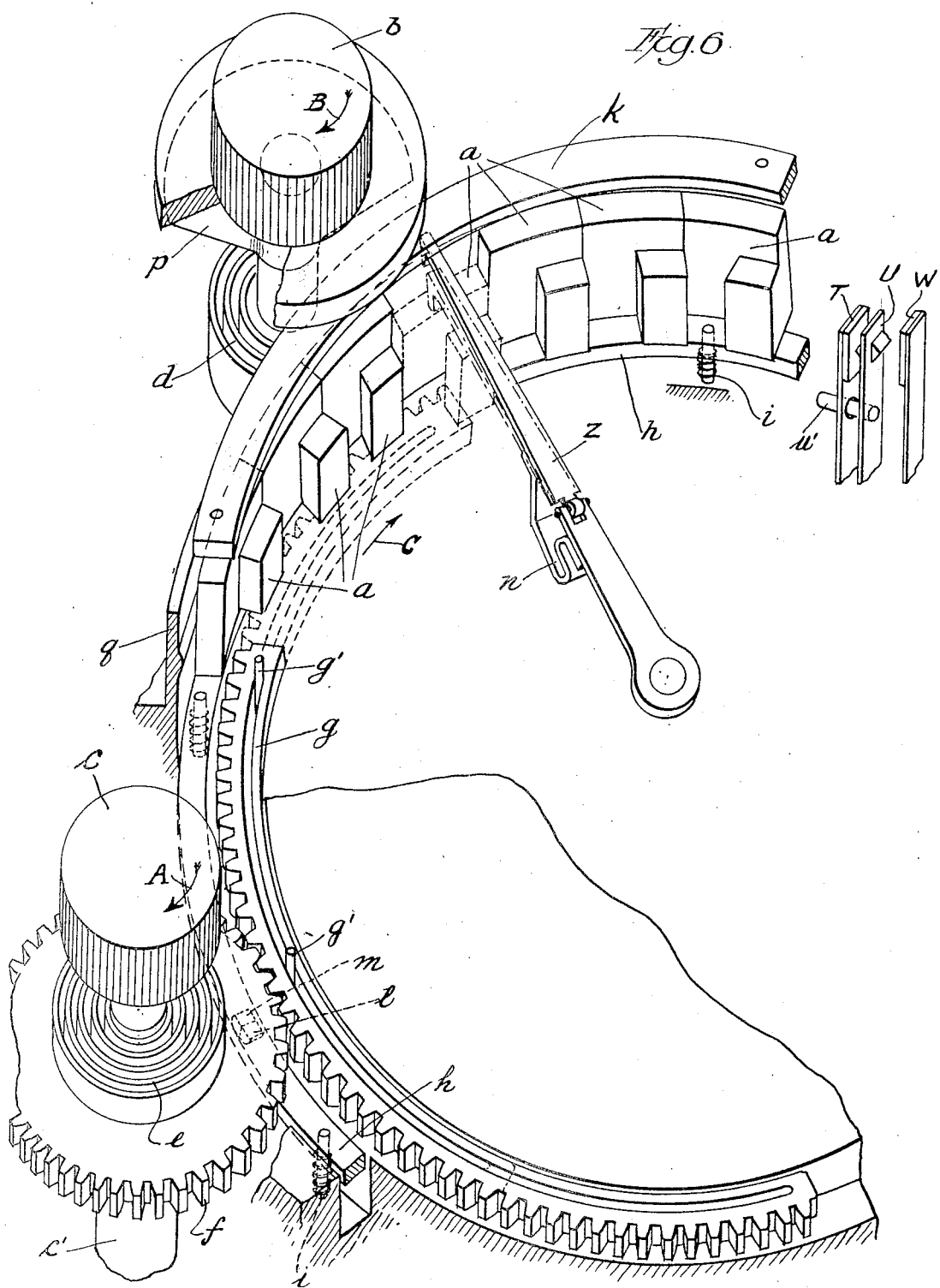
Fig. 6 illustrates in a perspective view, greatly enlarged, the principal parts of the device and their relation to each other.

The pins $a$ of the pin chest have an angular shape as is particularly obvious from Fig. 6. The smaller projection which extends radially inwardly serves as upper stop member for the pins $a$ which are supported by a ring $h$. The ring $h$ is pressed against the bottom face of the pins by spring means $i$. The radial face of this projection of the pin a serves as stop for the toothed segment g standing under spring tension, which is guided by way of example by two pins g. The pins of the pin chest are so arranged on an arc that the tip of the pointer of the electrical exposure meter can play above them. Above the pointer a second ring k is arranged on the same arc, which pointer is adapted to be urged by a cam p on the winding knob b of the shutter in the direction of the pins. (Arrow direction in Figure 2.) The gear wheel f mounted on the axis of the knob c has a projection l which on winding up of the spring e engages behind an impact member m mounted on the top face of ring h. Simultaneously the projection l and the impact member m represent the switch s of the photo current circuit drawn in Figure 5. As the very sensitive pointer z of the exposure meter must be moved in the direction indicated by the arrow in Figure 2 it possesses at its centre a link only movable in one direction which link is supported by a spring n.

Figure 1:
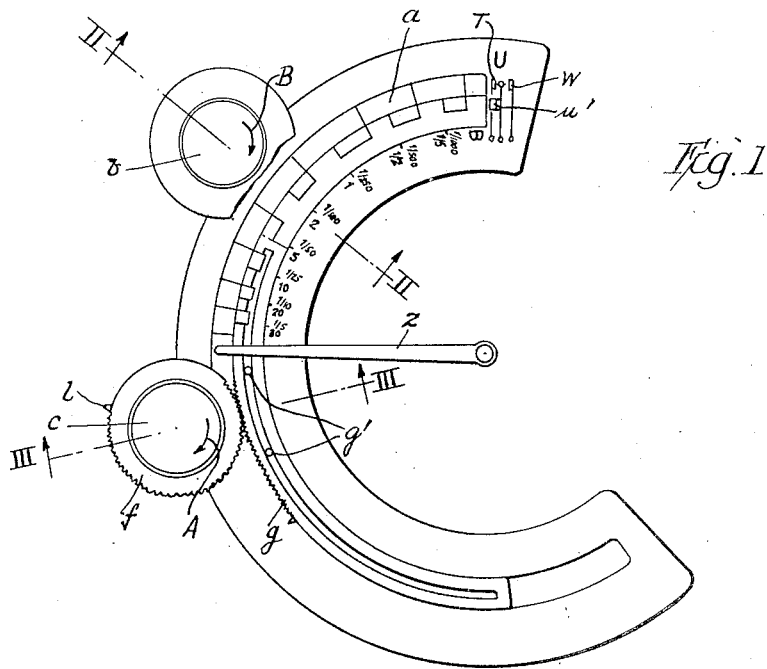
Fig. 1 is a plan view of the device of the invention, with certain parts omitted and broken away respectively to disclose the series of stop members which determine the automatic setting of the camera shutter.
Figure 2:
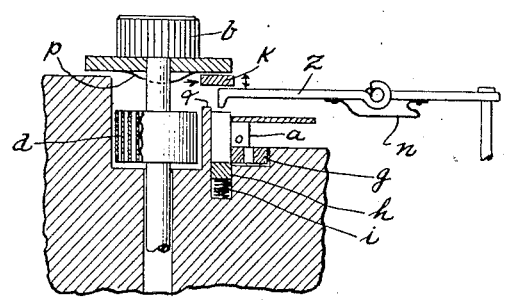
Fig. 2 is a sectional view on the line II—II of Fig. 1.
Figure 3:
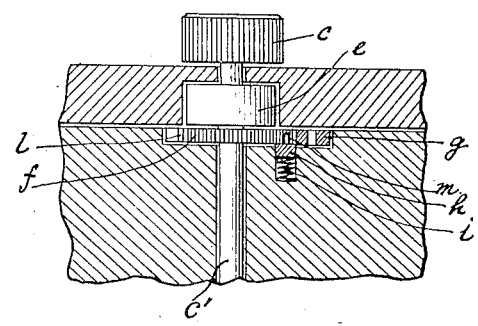
Fig. 3 is a sectional view on the line III—III of Fig. 1.

The procedure in an exposure is now the following:

The photographic camera through the front wall of which the light falls on to the blocking layer cell of the exposure meter is held in the direction of the object to be photographed. The spring e is tensioned by rotation of the knob c in the direction of the arrow A until the projection l engages the impact member m on the ring h, thereby the toothed segment g is brought into its starting position, illustrated in Fig. 6 and the switch s of the photo current circuit is closed so that the pointer of the instrument deflects and remains stationary above a definite pin a of the pin chest. By winding up of the second knob b in the direction of the arrow B the shutter is completely tensioned and the ring k is pressed down onto the pointer z by the cam disc p, the pointer z in turn presses onto the pin a of the pin chest lying beneath it. The corresponding pin a is pressed down, as shown in dotted lines in Fig. 6 and thereby prevents the free return movement of the toothed segment g (Figure 2). The ring h is simultaneously pressed down by the pressed down pin a. Thereby the projection m frees the impact member l mounted on the gear wheel f, and the toothed segment g now moves under spring pressure in the direction of the arrow C until it strikes against the radial projection of the pressed down pin a, as shown in dotted lines in Fig. 6. Thereby the correct shutter speed is adjusted.

Between the series of pins a and the guide wall q a spring device (not shown) is provided, which when ring h is pressed down prevents a downward movement of all the pins. Thus this guide q can for example itself be constructed as a spring, which exerts a small pressure on the pins a. As the absolutely exact exposure time is only then adjusted when at any one instant the pointer stands exactly in the centre of a pin (as a result of the finite breadth of the individual pins) a correction by adjustment of the objective stop is advantageous. A fixed point of the objective stop is connected with the tap 1 of the resistance W lying in series in the photo current circuit. Thus by adjustment of the objective stop a variation of the pointer deflection is possible. But in general the exactness of adjustment will be great enough even without this correction.

Figure 4:
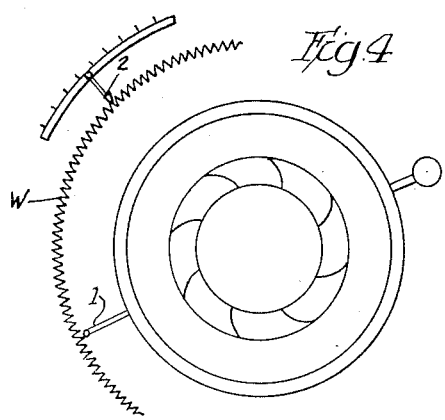
Fig. 4 illustrates diagrammatically the arrangement of the resistance of the exposure meter and its adjustment according to film speed.
Figure 5:
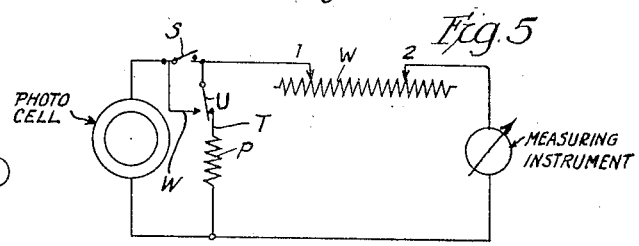
Fig. 5 is a wiring diagram of the exposure meter.

The tap 2 of the resistance W takes into account the light sensitivity of the exposure material and can be varied according to Figure 4 on a calibrated scale in the necessary limits.

If the necessary exposure time is greater than ⅕ second then the pointer of the exposure meter is no longer so far deflected that it comes to lie over a pin of the pin chest. If in such a case the knob b is wound up and the toothed segment g standing under spring tension is released, then the toothed segment is moved up to the outer end "B" of the pin chest, because none of the pins a of the pin chest is pressed down to stop this movement. Thereby according to Figures 1 and 6 and the circuit diagram (Figure 5) a reversing switch contact U is operated which normally engages a contact T connected to a resistance P in shunt to the photo cell. When the segment g engages the pin u' on the contact U the latter is disengaged from the contact T and is moved in engagement with a contact W, thus cutting out the shunt resistance P and again closing the photo cell circuit which was opened by the switch s owing to the running down of the gear wheel f. The exposure time adjustment now stands at "B" hence time exposure. The correct exposure time is read off on a second scale from the deflection of the pointer.

By winding up of the two knobs c and b the correct exposure time is thus adjusted. These two winding up devices can of course be combined, so that the whole exposure time measurement, shutter winding and adjustment of the correct exposure time can be undertaken by winding of a single knob.

The device can also find use for similar apparatus of the cinematographic and photographic arts the objectives of which require an adjustment dependent on the light conditions at any time. Thereby it is immaterial whether it is a question of the measurement of the exposure time or of the exposure intensity. Likewise instead of the element shown with pointer any other switch element influenced by the electrical system can be employed.

I claim:

1. In a photographic camera, the combination of a photoelectric exposure meter, a shutter, and means for automatically adjusting the speed of said shutter to a value indicated by said exposure meter, including means for manually tensioning said shutter; said photoelectric exposure meter including in a circuit a photoelectric cell, a measuring instrument having a rotatable pointer and a switch for opening and closing said circuit, a series of vertically yieldably mounted pins arranged in an arc concentric about the axis of rotation of said pointer and in a plane below the outer end of the same, each of said pins representing a predetermined shutter speed, said means for adjusting the speed of said shutter including a spring actuated arcuate member slidably mounted in an arc adjacent said series of pins, and a manually operable member for tensioning said arcuate member and for closing said switch which normally is open, means actuated by said shutter tensioning means for engaging the outer end of said pointer and urging it into engagement with the pin directly beneath the same, thereby depressing said pin, and means actuated by said shutter tensioning means at the end of the shutter tensioning operation for releasing said tensioned arcuate member so that the latter moves into engagement with the previously depressed pin, thereby adjusting the shutter speed automatically to the speed represented by said depressed pin.

2. In a photographic camera, the combination of a photoelectric exposure meter, a shutter, and means for automatically adjusting the speed of said shutter to a value indicated by said exposure meter, including means for manually tensioning said shutter; said photoelectric exposure meter including in a circuit a photoelectric cell, a measuring instrument having a rotatable pointer and a switch for opening and closing said circuit, a series of vertically yieldably mounted pins arranged in an arc concentric about the axis of rotation of said pointer and in plane below the outer end of the same, each of said pins representing a predetermined shutter speed, said means for adjusting the speed of said shutter including a spring actuated arcuate member slidably mounted in an arc adjacent said series of pins, and a manually operable member for tensioning said arcuate member and for closing said switch which normally is open, means actuated by said shutter tensioning means for engaging the outer end of said pointer and urging it into engagement with the pin directly beneath the same, thereby depressing said pin, and means actuated by said shutter tensioning means at the end of the shutter tensioning operation for opening said switch and for releasing said tensioned arcuate member so that the latter moves into engagement with the previously depressed pin, thereby adjusting the shutter speed automatically to the speed represented by said depressed pin.

3. In a photographic camera, the combination of a photoelectric exposure meter, a shutter, and means for automatically adjusting the speed of said shutter to a value indicated by said exposure meter, including means for manually tensioning said shutter; said photoelectric exposure meter including in a circuit a photoelectric cell, a measuring instrument having a rotatable pointer and a switch for opening and closing said circuit, a series of vertically yieldably mounted pins arranged in an arc concentric about the axis of rotation of said pointer and in a plane below the outer end of the same, each of said pins representing a predetermined shutter speed, said means for adjusting the speed of said shutter including a spring actuated arcuate member slidably mounted in an arc adjacent said series of pins, and a manually operable member for tensioning said arcuate member and for closing said switch which normally is open, means actuated by said shutter tensioning means for engaging the outer end of said pointer and urging it into engagement with the pin directly beneath the same, thereby depressing said pin, and means actuated by said shutter tensioning means at the end of the shutter tensioning operation for releasing said tensioning arcuate member so that the latter moves into engagement with the previously depressed pin, thereby readjusting the shutter tensioning means automatically to a tension corresponding to the speed represented by said depressed pin.

4. In a photographic camera, the combination of a photoelectric exposure meter, a shutter tensioning means and means for automatically adjusting said shutter tensioning means to a value indicated by said exposure meter, said photoelectric exposure meter including in a circuit a photoelectric cell, and a measuring instrument having a rotatable pointer, a series of vertically yieldably mounted pins arranged in an arc concentric about the axis of rotation of said pointer and in a plane below the outer end of the same, each of said pins representing a predetermined shutter speed, said means for automatically adjusting said shutter tensioning means including a spring actuated arcuate member slidably mounted in an arc adjacent said series of pins and a manually operable member for tensioning said arcuate member, means actuated by said shutter tensioning means for engaging the outer end of said pointer and urging it into engagement with the pin directly beneath the same, thereby depressing said pin, and means actuated by said shutter tensioning means at the end of its tensioning operation for releasing said tensioned arcuate member, so that the latter moves into engagement with the previously depressed pin, thereby readjusting the shutter tension means automatically to a tension corresponding to the speed represented by said depressed pin.

5. In a photographic camera, the combination of a photoelectric exposure meter, a shutter, and means for automatically adjusting the speed of said shutter to a value indicated by said exposure meter, including means for manually tensioning said shutter; said photoelectric exposure meter including in a circuit a photoelectric cell, and a measuring instrument having a rotatable pointer, a series of vertically yieldably mounted pins arranged in an arc concentric about the axis of rotation of said pointer and in a plane below the outer end of the same, each of said pins representing a predetermined shutter speed, said means for adjusting the speed of said shutter including an arcuate rack bar slidably arranged adacent said series of pins and a spring actuated manually rotatable gear engaging said rack bar for moving the same against the action of said spring into operative position, means actuated by said shutter tensioning means for engaging the outer end of said pointer and urging it into engagement with the pin directly beneath the same, thereby depressing said pin, and means actuated by said shutter tensioning means at the end of the shutter tensioning operation for releasing said tensioned arcuate rack bar so that the latter under the action of said tensioned spring moves into engagement with the previously depressed pin, thereby adjusting the shutter speed automatically to the speed represented by said depressed pin.

6. In a photographic camera, the combination of a photoelectric exposure meter, an objective lens, a variable diaphragm for said lens, a shutter, and means for automatically adjusting the speed of said shutter to a value indicated by said exposure meter, including means for manually tensioning said shutter; said photoelectric exposure meter including in a circuit a photoelectric cell, a variable resistance and a measuring instrument having a rotatable pointer, means operatively connected with said variable diaphragm for varying said resistance whenever said diaphragm is varied, a series of vertically yieldably mounted pins arranged in an arc concentric about the axis of rotation of said pointer and in a plane below the outer end of the same, each of said pins representing a predetermined shutter speed, said means for adjusting the speed of said shutter including a spring actuated arcuate member slidably mounted in an arc adjacent said series of pins, and a manually operable member for tensioning said arcuate member, means actuated by said shutter tensioning means for engaging the outer end of said pointer and urging it into engagement with the pin directly beneath the same, thereby depressing said pin, means actuated by said shutter tensioning means at the end of the shutter tensioning operation for releasing said tensioned arcuate member so that the latter moves into engagement with the previously depressed pin, thereby adjusting the shutter speed automatically to the speed represented by said depressed pin.

7. In a photographic camera, the combination of a photoelectric exposure meter, a shutter, and means for automatically adjusting the speed of said shutter to a value indicated by said exposure meter, including a rotatable member for manually tensioning said shutter; said photoelectric exposure meter including in a circuit a photoelectric cell, a switch for opening and closing said circuit, and a measuring instrument having a rotatable pointer, a series of vertically yieldably mounted pins arranged in an arc concentric about the axis of rotation of said pointer and in a plane below the outer end of the same, each of said pins representing a predetermined shutter speed, said means for adjusting the speed of said shutter including an arcuate rack bar slidably arranged adjacent said series of pins, and a spring actuated manually operable gear meshing with said rack bar, said manually operable gear when manually rotated to tension its associated spring moving said rack bar into a direction away from the region in which said pins are arranged, and at the end of this movement being effective to close said switch, means actuated by said rotatable shutter tensioning member for engaging the outer end of said pointer and urging it into engagement with the pin directly beneath the same, thereby depressing said pin, and means actuated by said shutter tensioning means at the end of the shutter tensioning operation for releasing said tensioned rack bar so that the latter moves into opposite direction in engagement with the previously depressed pin, thereby opening said switch and adjusting the shutter speed automatically to the speed represented by said depressed pin.

8. In a photographic camera, the combination of a photoelectric exposure meter, as set forth in claim 2, including a shunt resistance normally connected in the circuit of said exposure meter in shunt to said photoelectric cell and a switch for disconnecting said shunt resistance, said last named switch including a contact member which is actuated by said arcuate member after the latter upon actuation of said shutter tensioning means and an insufficient deflection of said pointer to cause the latter to move over any one of said pins has been moved past said series of pins, none of which is depressed, to open said switch for disconnecting said shunt resistance, whereby the measuring range of said exposure meter is changed.

KURT DZIEWIOR.